Patented July 2, 1940

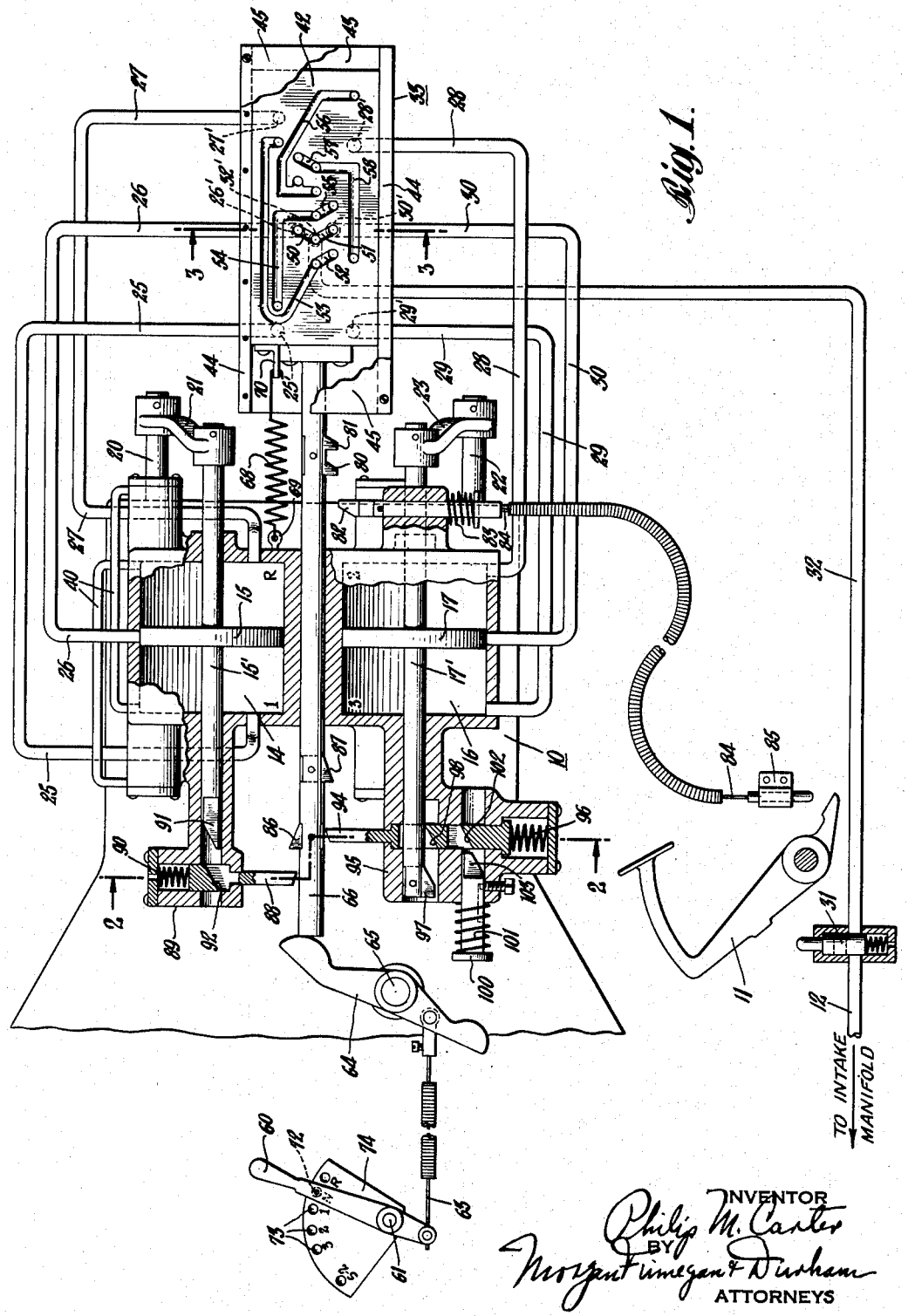

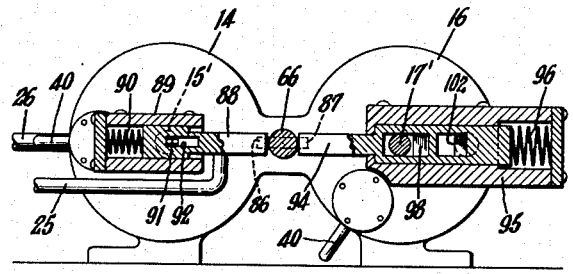
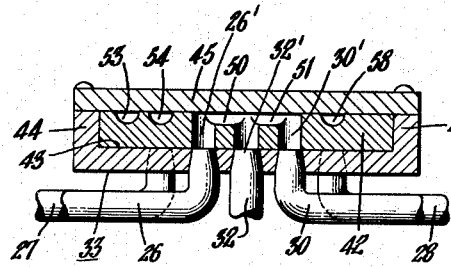

2,206,221

UNITED STATES PATENT OFFICE 2,206,221

FLUID PRESSURE OPERATED GEAR SHIFTER

Philip M. Carter, Detroit, Mich., assignor to Vaco Products, Inc., Jersey City, N. J., a corporation of Delaware Application October 8, 1937, Serial No. 167,973
In Great Britain May 28, 1937

7 Claims. (Cl. 192—3.5)

The present invention relates to new and useful improvements in fluid pressure operated gear shifters, and more particularly to such mechanisms which are semi-automatic in their operation.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a schematic view, partly in section, of a typical and illustrative embodiment of the invention as applied to a conventional type of automobile selective change speed gearing;

Fig. 2 is a section taken on the line 2—2 of Fig. 1;

Fig. 3 is a section taken on the line 3—3 of Fig. 1; and

Fig. 4 is a vertical sectional view illustrating the construction of one of the shifting cylinders.

The present invention has for its object the provision of a novel and improved semi-automatic fluid pressure operated means for shifting the gears of a conventional automobile transmission. A further object is the provision of a simple and relatively inexpensive gear shifter by which the gears may be shifted from a low speed to a high speed ratio by clutch operation alone after an initial manual setting of the controls, while at the same time the operator may select and shift into such other gear ratios as may be required by the operating conditions at any particular time.

As embodied, a control device is provided for controlling the shifting of the gears, this device being manually returnable to its low speed position and being biased so as to be resiliently moved to its high speed position under the control of an escapement mechanism which is jointly actuated by the clutch pedal and by a transmission element such a a gear shift rod. The control device may be manually movable to the positions for giving neutral, reverse and intermediate speeds.

The invention is particularly applicable to systems utilizing pressure operated fluid motors and valve arrangements of the general type described in the specification of British Patent No. 457,068 and in United States Patent No. 1,733,502. The control device may consist of a selector valve or switch which controls the vacuum applied to the fluid-pressure motors from the inlet manifold of the engine.

A lever is provided on the steering column or in any other suitable position and is adapted according to one embodiment of the invention to move the control device to its neutral, reverse or low speed positions from any speed position or to move it to its intermediate speed position from the high speed position.

The control device is adapted to be latched in either its low or intermediate speed positions by a latching or escapement mechanism comprising a latch which is adapted to be released by the engagement of the clutch and a latch which is adapted to be released each time the gears are shifted to their low or intermediate positions. Thus if the lever is moved to its low speed and then to its high speed position the gears are caused to shift first to low speed, then to intermediate speed and finally to high speed, the control device moving to the next higher speed position after the completion of each change of gear.

Intermediate speed is obtained from high speed by moving the lever while declutching.

If desired, the action of shifting into intermediate speed may be skipped after the selector has been moved so that this action would normally occur, and this may be accomplished by moving the lever so as to release the intermediate speed latch which it may do owing to the lost motion connection between the lever and the control device, thereby enabling the control device to move directly to its high gear position after meshing the gears in low speed. The low speed latch may also be omitted, if desired, in which case it is necessary to hold the lever in its low speed position until the gears have actually been shifted into first or low speed.

The latch rod which is withdrawn by the engagement of the clutch is adapted to engage low and intermediate speed shoulders on the control device and the other latch is adapted to be withdrawn from its shoulder by movement of the intermediate speed shift rod. A further latch, which is adapted to be withdrawn directly when the lever is moved to its skip position, may be provided to hold the control device in its intermediate position.

Assuming that the engine of the car is running and the control and gears are in their neutral positions, the driver, in order to drive off, declutches and moves the lever to its high speed position, the control device moving as far as its low speed position, where it is retained by the latch, and causing the gears to engage low speed. On the driver engaging the clutch the car moves off in low gear and at the same time the escapement latch is released allowing the control device to move to its intermediate position where it is retained by the other latch.

On declutching again the intermediate gear is engaged and on engaging the clutch the control device moves to its high speed position. Finally to engage high gear, the clutch pedal is again depressed (to declutch) and released.

When stopping the vehicle, the driver declutches and moves the lever with the control device to the low speed position where the latter is retained by the latch. This causes the gears to change to low speed and the cycle of operations is repeated. To change from high to intermediate gear, the lever is moved back to its intermediate position where the control device is retained by the latch. On declutching the gears engage in the intermediate speed and, if the lever has been moved back to high speed position, the control device subsequently moves back to its high speed position.

If desired, however, the driver may, before declutching, move the lever beyond the high speed position to its skip position. This will serve to move the control device from low to high, skipping the intermediate position. This also enables the change to low gear to be omitted if the operator changes his mind.

The operation of declutching is caused to apply the vacuum to the selected change-speed motors or to energize solenoids, when these are used, by any suitable method as, for example, in that described in the specification of British Patent 457,068 or that described in United States Patent No. 1,733,502.

It will be understood that the foregoing general description and the following detailed description as well, are exemplary and explanatory of the invention but are not restrictive thereof.

Referring now in detail to the illustrative embodiment of the invention shown in the accompanying drawings, there is provided the usual selective gear transmission 10, which is adapted to transmit power at different ratios from the automotive engine to the propeller shaft (neither of which is shown) under control of the clutch pedal 11, depression of which causes disengagement of the clutch. The illustrative embodiment is suction-operated by suction derived from the usual intake manifold of the engine to which is connected the main suction line 12. The fluid pressure operated gear shifting means comprise two cylinders 14 and 16 in which are reciprocably mounted pistons 15 and 17 on piston rods 15' and 17', and these rods are slidable in the sleeve like end portions of the cylinder walls. Piston rod 15' is connected at one end to the gear shifting fork rod 20 for first speed and reverse by means of the yoke 21, while piston rod 17' is similarly connected to the gear shifting fork rod 22 for second speed and third speed by means of the yoke 23. Cylinders 14 and 16 are preferably mounted close to each other in parallel and may be supported upon the upper portion of the transmission case. Suitable interlock means of conventional construction may be provided for preventing movement of piston 15 and its associated shift rods 20 away from the neutral position shown except when the piston 17 and its associated shift rod 22 are in neutral position, and vice versa.

Pistons 15 and 17 are moved to one end or the other or are returned to the central position of their respective cylinders by the application of suction to one end or the other or to the center of their cylinders through the pipes 25, 26, 27, 28, 29 or 30, and suction is selectively applied to these lines from the master line 12 through the master control valve 31, line 32 and selector valve 33, and valve 31 is opened when clutch pedal 11 is depressed to disengage the clutch.

When suction is applied to one of the lines 25 to 30, to move the piston 15 or 17, air is admitted to the opposite side of the piston to facilitate its movement by automatic release valves such as those fully described and shown in the prior patent to Linsley, No. 1,733,502. Each of these release valves comprises a valve plunger 35 having a reduced head 36 which is seated by spring 38 against the face of port 37 opening into one end of the cylinder, and when unseated, connects port 37 to the atmospheric port 39. Valve plunger 35 is adapted to be unseated against the compression of spring 38 by suction applied to the pipe 40 which connects the rear face of the plunger 35 with the opposite end of the cylinder.

The selector valve is illustratively shown as a plate 42 slidable over the valve body 43 and retained thereon by side members 44 and a cover plate 45. Slide plate 42 is provided with various ducts which in the various positions of the slide serve to connect the main suction line 32 with the various individual suction lines 25 to 30. As shown, lines 25 to 30 terminate in ports 25' to 30' in the valve body 43, while line 32 is connected to port 32'.

In the position shown, corresponding to neutral, port 32' is connected with ports 26' and 30' by ducts 50 and 51 formed in the valve slide 42. By moving valve slide 42 to the right, reverse position is obtained and then port 32 is connected with ports 30' and 27' by ducts 52 and 53. In first speed position, with the valve slide 42 immediately to the left of the position shown, port 32' is connected with port 30' and 25' by ducts 54 and 55. Second speed position, the next one to the left, connects port 32', with the ports 26' and 28' by duct 56. Third speed position, at the extreme left, causes port 32' to be connected with ports 29' and 26' through ducts 57 and 58.

Means are provided for moving the selector valve slide 42 to its various positions, and these means comprise a selector control lever 60 pivotally mounted at 61 adjacent to the steering wheel column or some other convenient location. Lever 60 is connected by push-pull wire control 63 with a lever 64 pivotally mounted at 65 on the clutch housing. The ends of lever 64 are rounded and one end bears against an end of the push rod 66, which is connected to one end of the valve slide 42. A tension spring 68 connected between lugs 69 and 70, on the shifting cylinder and valve slide respectively, tends to move the valve slide 42 in one direction, while it is moved in the other direction by the pressure exerted by lever 64 against the end of rod 66. Lever 60 is releasably held in any one of its several positions by spring detent 72 engaging with depressions 73 on the segment 74, these depressions corresponding to reverse, neutral, first, second and third speed gear positions.

Means are provided for holding the selector valve in first speed position until the gears have been meshed in first speed and the clutch has been engaged, as well as for holding the selector valve in second speed position until the gears have been meshed in that speed and the clutch has been engaged, and these means cooperate with the means for resiliently urging the selector valve towards high speed position.

As embodied, detents 80 and 81 are mounted on the push rod 66 and are adapted to engage with latch bar 82 to hold push rod 66 and valve slide 42 against movement under the influence of spring 68. Latch bar 82 is resiliently retracted by spring 83 and upon disengagement of the clutch, is projected into the path of stops 80 and 81. Latch bar 82 is connected to push pull wire 84 having its end slidably mounted in block 85, and is adapted to be engaged and moved by a portion of the clutch pedal 11.

Other detent means are provided and are adapted to be released by movement of the gears into mesh. As embodied, a second speed position detent 86 and a third speed position detent 87 are mounted on the push rod 66. Detent 86 is adapted to be engaged by latch bar 88 which is slidably mounted in a support 89 and is resiliently urged into latching position by spring 90. It is retracted from this position by means of a wedge-shaped end 91 of piston rod 15' cooperating with the beveled face of slot 92 formed in the latch bar 88. The third speed detent 87 is adapted to engage latch bar 94, which is slidably mounted in the support 95, is resiliently urged into latching position by spring 96 and is retracted from latching position by the bevel member 97 adapted to move into contact with the beveled face 98 as piston 17 moves to second speed position.

Latch 94 may also be withdrawn by moving the selector lever 60 to the position indicated by "S—2," in which position the lower end of lever 64 presses bar 100 against the compression of spring 101 so that its beveled end 103 engages the beveled face 102 of the latch bar 94 and serves to retract the pin 94, thereby enabling the operator to skip second speed in normal shifting, or to cancel his previous preselection of second speed. That is, if an operator on approaching a hill moves the lever 60 from high speed position to second speed position, while travelling in high speed position, so that on declutching he would shift into second, and thereafter the operating conditions change so that second speed is not required, the selector valve may be moved back to high speed position by moving the selector lever 60 to "S—2" position.

The operation of the described embodiment may be detailed as follows:

Assuming that the engine is running with the gear shifting parts in the position shown in Figure 1, and the driver wishes to start the vehicle: The operator moves the selector lever to position "3", causing a movement of the selector slide 42 to the left to first speed position, under the influence of spring 68 until detent 86 engages the end of latch bar 88. When the clutch 11 is depressed, valve 31 is opened to apply suction to line 32, latch bar 82 is projected into the path of detent 80 and also serves to prevent further movement. The suction is thereby applied through ducts 54 and 55 to lines 25 and 30 holding piston 17 in neutral position and moving piston 15 to the left into first speed position, thereby causing a similar movement of the shift rod 20 to mesh the transmission gears in first speed ratio. When the gears are fully meshed, end 91 of piston rod 15' causes retraction of the latch bar 88 thereby releasing the push rod 66 at this end, but it is still held against movement until the clutch is engaged which causes the retraction of latch bar 82 freeing detent 80 and allowing the selector slide 42 to move to its next or second speed position. The selector cannot move to third speed position as yet due to the detent 87 which is engaged by the end of latch bar 94.

The operator may then shift into second speed by declutching, which positions latch 82 in the path of detent 81, applies suction through valve 31, line 32, duct 56, lines 26 and 28 and thereby moves the piston 15 and shift rod 20 to neutral position, releasing the conventional transmission interlock, and thereafter moving piston 17 to the right into second speed position. In second speed position, beveled member 97 retracts latch bar 94 to release detent 87, and when the clutch pedal 11 is returned to engaged position, the latch bar 82 is retracted allowing the selector slide 42 to move to third speed position.

When the operator next declutches, suction is applied through valve 31, line 32, ducts 57 and 58, lines 26 and 29, thereby causing the piston 17 and its shift rod 22 to move to third speed position.

On stopping the vehicle, or at any other time, the operator may move the selector lever 60 to first speed position, thereby pushing the selector slide 42 to first speed position, and when he next declutches the suction applied through valves 31, line 32, ducts 54 and 55, lines 25 and 30, first neutralizes piston 17 and its shift rod 22 and then moves the piston 15 and shift rod 20 to first speed position.

Reverse speed is obtained by declutching and moving the selector lever 60 to "R" position. This moves the selector valve slide 42 to reverse position (extreme right) and suction applied through valve 31, line 32, ducts 52 and 53 and lines 27 and 30 neutralizes the piston 17 and shift rod 22 and then moves piston 15 and its shift rod 20 to the right to shift the gears into reverse.

During any movement of either of the pistons 15 or 17 under the influence of suction, one of the automatic valves 35 is operated to admit air to the opposite end of the cylinder, thereby facilitating movement of the piston.

The invention in its broader aspects is not limited to the specific mechanisms shown and described but departures may be made therefrom within the scope of the accompanying claims without departing from the principles of the invention and without sacrificing its chief advantages.

What I claim is:

1. In a gear shifter to be operated by differences in fluid pressure, a movable selector controlling the fluid pressure difference on the shifting means for various forward and reverse speeds, means for urging the selector to a high speed position, manually operable means to move the selector from said high speed position to any of its other positions and an escapement means for releasing the selector step by step from a low speed to a high speed position, said escapement means being operated in part by the fluid pressure difference operated means.

2. In an automotive gear shifter for use with a selective gear transmission, the combination of fluid pressure difference operated means for shifting the gears, a selector controlling the fluid pressure difference acting on the means, manual means for moving the selector, resilient means urging the selector towards a given position and an escapement permitting step by step movement of the selector, a portion of the escapement being controlled by operation of the fluid pressure difference operated means.

3. In a gear shifter to be operated by differences in fluid pressure to be used in a vehicle having a clutch pedal, a movable selector controlling the fluid pressure difference acting on the shifting means for various forward and reverse speeds, means for moving the selector step by step to a high speed position, means for reversely moving the selector to a low speed position, one of said selector moving means being manually operated while the other is resiliently operated, and means interconnecting one of the selector moving means with the clutch operating means whereby movement of the selector is in part dependent upon the movement of the clutch pedal.

4. In a gear shifter to be operated by differences in fluid pressure, a movable selector controlling the fluid pressure difference acting on the shifting means for various forward and reverse speeds, means for normally urging the selector to a high speed position, manually operable means to move the selector away from the high speed position to a low speed position and means for releasing the selector step by step, said releasing means being controlled in part by the shifting action of the fluid pressure difference operated means.

5. In a gear shifter to be operated by differences in fluid pressure, to be used in a vehicle having clutch operating means, a movable selector controlling the fluid pressure difference acting on the shifting means for various forward and reverse speeds, means for urging the selector towards a high speed position, means for reversely moving the selector to a low speed position, latch means for preventing movement of the selector to the next higher speed position until the gears have been shifted into each speed, and manual means for operating the latch means to skip a shift into a particular gear ratio.

6. In a gear shifter to be operated by differences in fluid pressure, a movable selector controlling the fluid pressure difference acting on the shifting means for various forward and reverse speeds, means for resiliently moving the selector towards a high speed position, manual means for returning the selector to a low speed position, latch means for holding the selector against resilient movement in certain of its positions, means operated by the fluid pressure difference operated shifting means for releasing certain of said latches, and other means for releasing the others of said latches.

7. In a gear shifter to be operated by differences in fluid pressure, a movable selector controlling the fluid pressure difference acting on the shifting means for various forward and reverse speeds, means for resiliently moving the selector towards a high speed position, manual means for returning the selector to a low speed position, latch means for holding the selector against resilient movement in certain of its positions, means operated by the fluid pressure difference operated shifting means for releasing certain of said latches, and other means for releasing the others of said latches, said selector being manually movable to and from reverse speed position.

PHILIP M. CARTER.